United States Patent
Wang

(10) Patent No.: US 9,459,094 B2
(45) Date of Patent: Oct. 4, 2016

(54) COLOR-ENCODED FRINGE PATTERN FOR THREE-DIMENSIONAL SHAPE MEASUREMENT

(71) Applicant: Hong Kong Applied Science and Technology Research Institute Company Limited, Hong Kong (HK)

(72) Inventor: Zhao Wang, Hong Kong (HK)

(73) Assignee: Hong Kong Applied Science and Technology Research Institute Company Limited, Shatin, New Territories (HK)

( * ) Notice: Subject to any disclaimer, the term of this patent is extended or adjusted under 35 U.S.C. 154(b) by 562 days.

(21) Appl. No.: 14/024,645

(22) Filed: Sep. 12, 2013

(65) Prior Publication Data
US 2015/0070473 A1   Mar. 12, 2015

(51) Int. Cl.
G06K 9/00   (2006.01)
G01B 11/25   (2006.01)

(52) U.S. Cl.
CPC .................. G01B 11/2509 (2013.01)

(58) Field of Classification Search
CPC ..... G06T 7/0057; G06T 17/10; G01B 11/22; G01B 11/2509; G01B 11/2513; G01B 11/2527; G01B 11/2536
See application file for complete search history.

(56) References Cited

U.S. PATENT DOCUMENTS

| | | | |
|---|---|---|---|
| 6,208,416 B1* | 3/2001 | Huntley | G01B 11/2536 356/512 |
| 6,788,210 B1* | 9/2004 | Huang | G06T 17/10 340/612 |
| 8,436,890 B2 | 5/2013 | Mamiya | |
| 2005/0046873 A1* | 3/2005 | Suzuki | G06T 7/0057 356/605 |
| 2006/0072122 A1* | 4/2006 | Hu | G01B 11/2527 356/603 |
| 2007/0206204 A1* | 9/2007 | Jia | G01B 11/254 356/604 |
| 2007/0211258 A1* | 9/2007 | Lee | G01B 11/25 356/605 |
| 2010/0188400 A1* | 7/2010 | Chen | G06T 7/0057 345/420 |
| 2010/0290060 A1* | 11/2010 | Mohazzab | G01B 11/25 356/492 |
| 2011/0205356 A1* | 8/2011 | Kim | H04N 7/18 348/135 |

(Continued)

OTHER PUBLICATIONS

Su, W.-H., "Color-encoded fringe projection for 3D shape measurements," Optics Express, vol. 15, No. 20, pp. 13167-13181, Oct. 1, 2007.

(Continued)

*Primary Examiner* — Gregory M Desire
(74) *Attorney, Agent, or Firm* — Ella Cheong Hong Kong; Sam T. Yip

(57) ABSTRACT

This invention discloses using one or more color-encoded fringe patterns for optically, three-dimensionally measuring an object's shape. In one embodiment, a color-encoded fringe pattern comprising a plurality of fringes that are modulated in intensity is configured as follows. An individual fringe selected from the fringes comprises a colored line at a location on the fringe width. The colored line has a line width that is substantially narrower than the fringe width in order that the colored line has a substantially similar intensity over the line width. The individual fringe excluding the colored line has a fringe color that is substantially uniform over the individual fringe. The fringe color is substantially different from the line color. Fringe colors of all the fringes are substantially similar, thereby enabling a major portion of the color-encoded fringe pattern to provide a substantially-uniform illumination color for projection onto the object.

21 Claims, 6 Drawing Sheets
(4 of 6 Drawing Sheet(s) Filed in Color)

(56) References Cited

U.S. PATENT DOCUMENTS

| | | | |
|---|---|---|---|
| 2012/0086950 A1* | 4/2012 | Sho | G01B 11/2509 356/601 |
| 2013/0301909 A1* | 11/2013 | Sato | G01B 11/25 382/154 |
| 2014/0063192 A1* | 3/2014 | Sonoda | G01B 11/22 348/46 |
| 2014/0064603 A1* | 3/2014 | Zhang | G01B 11/2513 382/154 |
| 2015/0070473 A1* | 3/2015 | Wang | G01B 11/2509 348/49 |
| 2016/0094830 A1* | 3/2016 | Taubin | H04N 13/0048 348/46 |

OTHER PUBLICATIONS

Karpinsky, N., and Zhang, S., "High-resolution, real-time 3D imaging with fringe analysis," Journal of Real-time Image Processing, vol. 5, No. 3, pp. 1-12, Aug. 6, 2010.

Chen, H.J., Zhang, J., LV, D.J., and Fang, J., "3-D shape measurement by composite pattern projection and hybrid processing," Optics Express, vol. 15, No. 19, pp. 12318-12330, Sep. 17, 2007.

\* cited by examiner

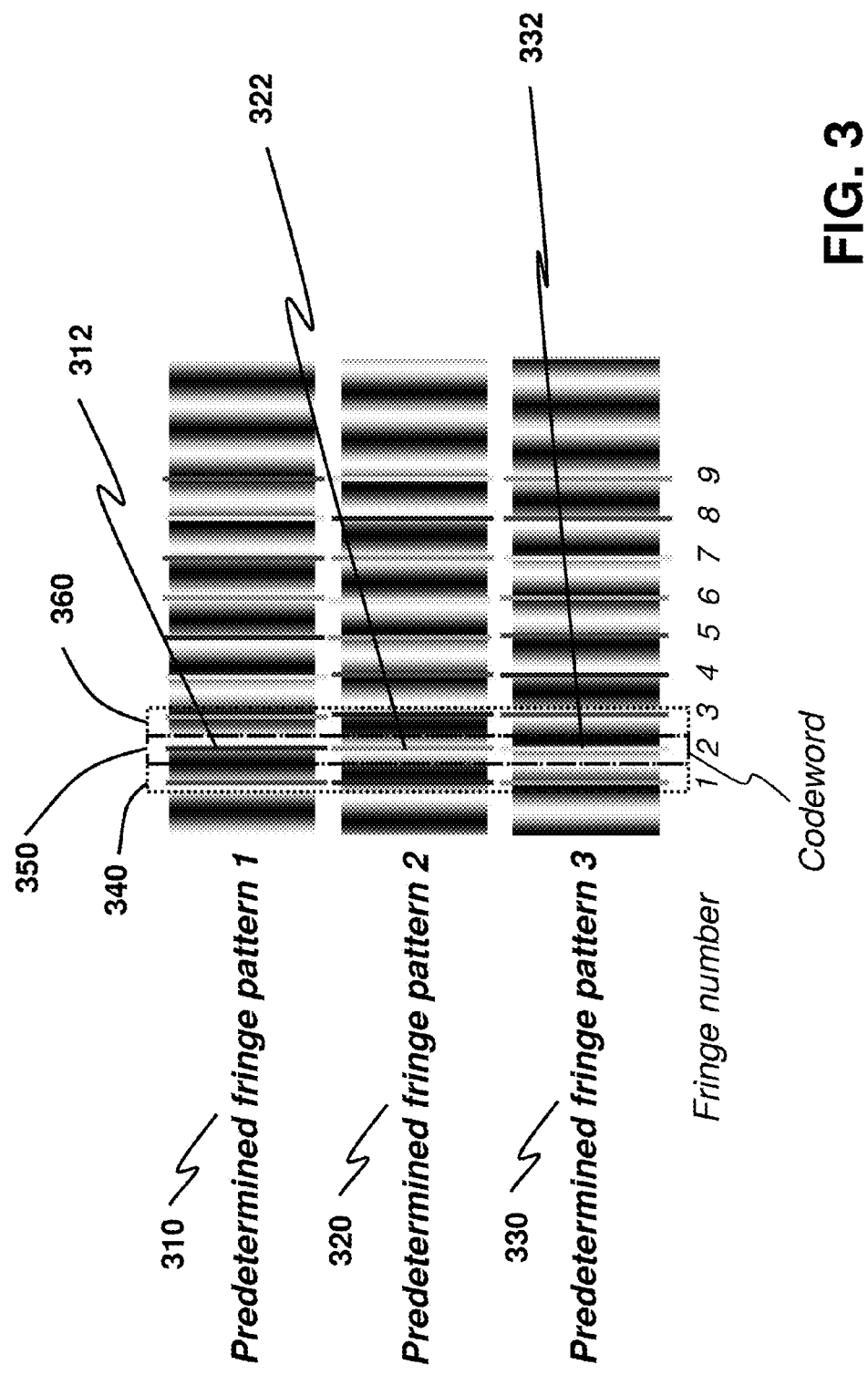

COLOR-ENCODED FRINGE PATTERN FOR THREE-DIMENSIONAL SHAPE MEASUREMENT

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to three-dimensional measurement of an object's shape based on optically projecting one or more fringe patterns onto the object and analyzing resultant one or more distorted fringe images reflected from the object.

BACKGROUND

In the art, three-dimensional shape measurement of an object can be performed by using a projector to project one or more fringe patterns onto an object and then computing a depth distribution of the object's shape based on one or more distorted fringe images reflected from the object and subsequently captured by a camera. To increase the spatial resolution in the shape measurement, each fringe pattern may include periodically-arranged fringes each of which is modulated in intensity by a modulating function that is, or is sufficiently close to, a sine or cosine function plus a certain constant in order that the modulated intensity is always non-negative. That is, each of the fringes is substantially sinusoidally modulated in intensity.

An overview of the three-dimensional shape measurement using substantially sinusoidally modulated fringe patterns is given by KARPINSKY, N., and ZHANG, S., "High-resolution, real-time 3D imaging with fringe analysis," *Journal of Real-time Image Processing*, vol. 5, no. 3, pp. 1-12, 6 Aug. 2010, the disclosure of which is incorporated by reference herein in its entirety. A distorted fringe image can typically be modeled as $$I(x, y) = I'(x, y) + I''(x, y) \cos [\phi(x, y)]$$

where $I(x, y)$ is the observed intensity level at the coordinate $(x, y)$, $I'(x, y)$ is the average intensity over the distorted fringe image, $I''(x, y)$ is the intensity modulation, and $\phi(x, y)$ is the phase. In particular, a phase map, having values of $\phi(x, y)$ for all coordinates over the distorted fringe image, is used to calculate the depth distribution of the object's shape. In the art, it is generally considered that computation based on observed intensity levels in a distorted fringe image or a number of such images can only lead to $\phi(x, y)$ values that have $2\pi$ ambiguity because of involving an inverse tangent function in the computation of $\phi(x, y)$. As such, $\phi(x, y)$ is often expressed as $$\phi(x, y) = \theta(x, y) + 2\pi \times N(x, y)$$

where $\theta(x, y)$, between $-\pi$ to $\pi$, is computable from the observed intensity levels, and $N(x, y)$, being an integer, is referred to as a fringe order. In the art, the collection of $\theta(x, y)$ values is often referenced as a wrapped phase map while the phase map $\phi(x, y)$ is alternatively named as an unwrapped phase map. Generally, it is required to compute the fringe order to "unwrap" the wrapped phase map in order to obtain the unwrapped phase map.

The fringe order is related to the number of cycle(s) of fringes that a particular fringe in the distorted fringe image is displaced from its original position in the fringe pattern. A method for assisting the determination of the fringe order is disclosed by S U, W.-H., "Color-encoded fringe projection for 3D shape measurements," *Optics Express*, vol. 15, no. 20, pp. 13167-13181, 1 Oct. 2007, the disclosure of which is incorporated by reference herein in its entirety. In this method, the sinusoidal fringe pattern is superimposed with a color pattern formed by a number of colored strips sequentially arranged together. Adjacent two of the colored strips have substantially different colors so as to provide signatures to the fringes after being distorted by the object. The colored strips may have a width close to a fringe's width. Thereby the fringe order can be obtained after the colored, sinusoidal fringe pattern is distorted by the object to form a colored, distorted fringe image. Intensity components of the colored, distorted fringe image are used to compute the wrapped phase map. However, since the object's surface usually has different reflectance responses to different colors of light, the presence of multiple colors in the colored fringe patterns introduces interference to the intensity components of the colored, distorted fringe image. It follows that the distribution of the intensity components does not entirely model the distortion caused by the object's shape, thus reducing the accuracy in the three-dimensional measurement of the object's shape.

There is a need in the art to have a design of a fringe pattern improved over the teachings of SU such that the improved design enables the fringe order to be computed while the measurement accuracy can be maintained.

SUMMARY OF THE INVENTION

The present invention provides an optical method for three-dimensionally measuring an object's shape.

The method comprises projecting one predetermined fringe pattern onto the object or successively projecting more-than-one predetermined fringe patterns onto the object. The more-than-one predetermined fringe patterns may be derived from one reference fringe pattern with different phase offsets for different predetermined fringe patterns, each of the phase offsets denoting a shift in position for fringes in the reference fringe pattern. As a result, the object distorts the one or more predetermined fringe patterns, thereby generating one or more distorted fringe images. The method further comprises analyzing the one or more distorted fringe images to estimate an unwrapped phase map that characterizes one or more intensity distributions of the one or more distorted fringe images. A depth distribution of the object's shape is hence obtainable from the unwrapped phase map.

Each of the one or more predetermined fringe patterns comprises plural fringes that are periodically arranged thereon. Each of the fringes has a fringe width and is modulated in intensity across the fringe width. Preferably, the intensity is substantially sinusoidally modulated. In particular, at least one of the one or more predetermined fringe patterns is further configured to be a color-encoded fringe pattern.

The color-encoded fringe pattern is configured as follows. An individual fringe selected from the fringes comprises a colored line at a location on the fringe width. The colored line has a line width that is substantially narrower than the fringe width in order that the colored line has a substantially similar intensity over the line width. The location of the colored line determines the intensity thereof. The colored line has a line color. The individual fringe excluding the colored line has a fringe color that is substantially uniform over the individual fringe. The fringe color is substantially different from the line color. Furthermore, fringe colors of all the fringes are substantially similar. Thereby, a major portion of the color-encoded fringe pattern is enabled to provide a substantially-uniform illumination color for projection onto the object.

Preferably, the location of the colored line in the individual fringe of the color-encoded fringe pattern is selected such that, at this location, the individual fringe has an intensity in the range from 0.2 to 0.8 of a maximum intensity over the fringe width of the individual fringe. Furthermore, the locations of colored lines in all the fringes of the color-encoded fringe pattern may be selected such that, at these locations, all the fringes of the color-encoded fringe pattern have substantially similar intensities. Alternatively, these locations may be selected such that intensities of all the fringes of the color-encoded fringe pattern are non-unique.

In one approach, line colors of any adjacent two of the fringes are substantially different to thereby provide differentiation information for assisting determination of fringe orders during estimation of the unwrapped phase map.

In another approach, line colors of all the fringes in the color-encoded fringe pattern, collectively constituting an ordered sequence of selected line colors, are configured such that the ordered sequence is a pseudo-random sequence or a periodic repetition thereof.

In yet another approach, N predetermined fringe patterns, N greater than 1, are used. Each of the N predetermined fringe patterns having the same number of fringes. Each fringe is referenced by a fringe number. In particular, M out of the N predetermined fringe patterns, where M is greater than 1 and is less than or equal to N, are selected. Each of the M selected predetermined fringe patterns is configured to be the color-encoded fringe pattern. Line colors of related fringes under the same fringe number in the M selected predetermined fringe patterns collectively constitutes a codeword for related fringes under this fringe number. Furthermore, codewords for any first related fringes and any second related fringes, where the first and the second related fringes are fringe-wise adjacent, are substantially different to thereby provide differentiation information for assisting determination of fringe orders during estimation of the unwrapped phase map.

If any of the one or more distorted fringe images is a distorted color-encoded fringe image generated from distorting a color-encoded fringe pattern by the object's shape, preferably the method further comprises decomposing the distorted color-encoded fringe image into an intensity-component image and a color-component image. The intensity-component image is usable in estimating a wrapped phase map. The color-component image is usable in unwrapping the wrapped phase map to yield the unwrapped phase map.

The present invention further provides a fringe-pattern generating subsystem configured to be used in a system for three-dimensionally measuring an object's shape. The fringe-pattern generating subsystem comprises one or more processors configured to generate one or more predetermined fringe patterns, wherein the one or more predetermined fringe patterns are configured as disclosed above.

The present invention additionally provides a system for three-dimensionally measuring an object's shape. The system comprises the fringe-pattern generating subsystem as disclosed above, a projector, a camera and a data-processing subsystem. The projector is used for projecting the one or more predetermined fringe patterns generated by the fringe-pattern generating subsystem onto the object. The camera is employed to acquire one or more distorted fringe images generated by distorting the one or more predetermined fringe patterns when projected onto the object. The data-processing subsystem is configured to estimate an unwrapped phase map that characterizes one or more intensity distributions of the one or more distorted fringe images by analyzing the one or more distorted fringe images acquired by the camera, and to compute a depth distribution of the object's shape according to the unwrapped phase map.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3 depicts an example of choosing line colors of colored lines to form a codeword when a plurality of color-encoded fringe patterns is used in three-dimensional measurement of an object.

DETAILED DESCRIPTION OF THE INVENTION

Figure 1:
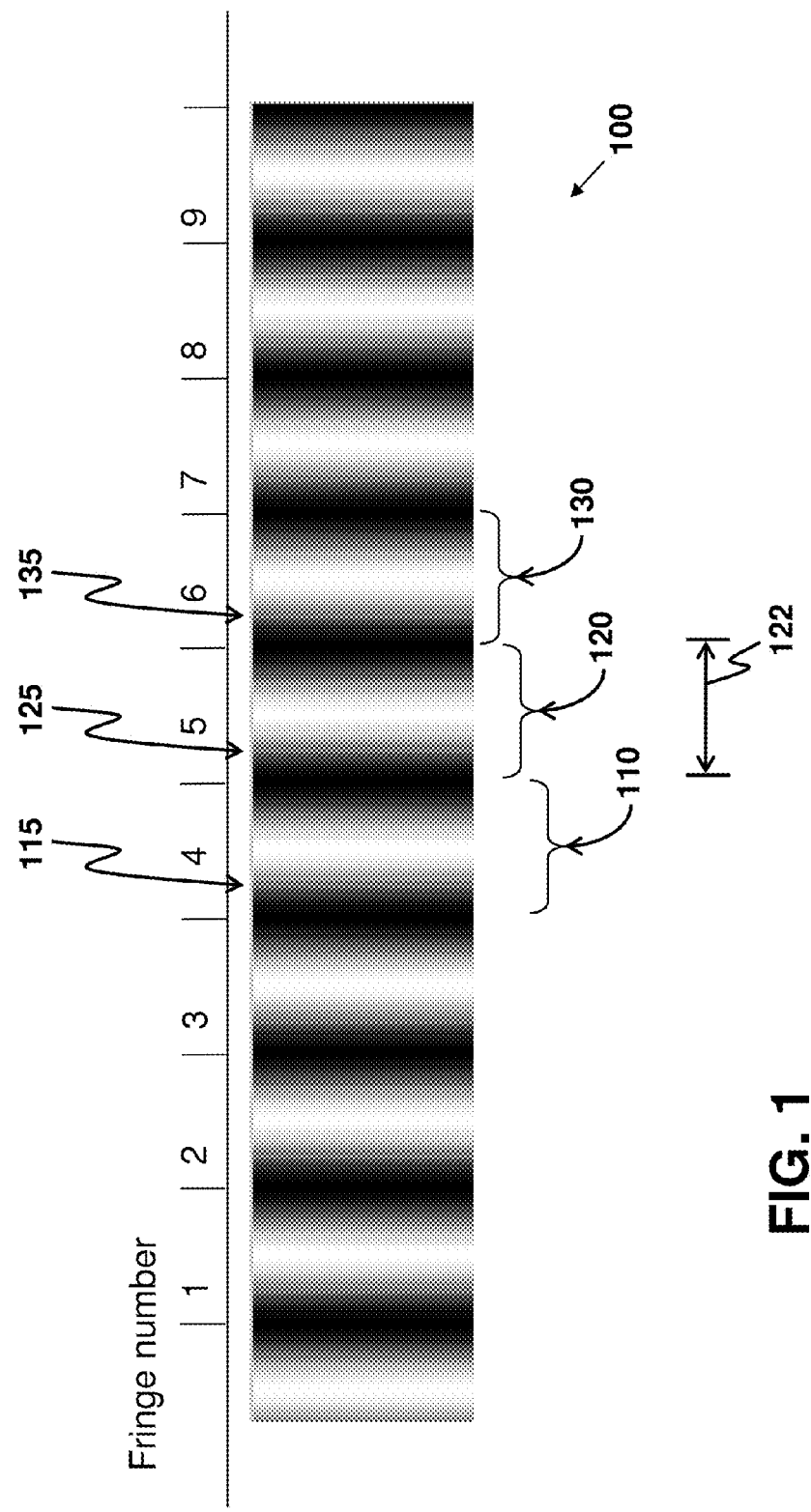
FIG. 1 depicts a color-encoded fringe pattern in accordance with an exemplary embodiment of the present invention.

A fringe pattern for projection onto an object is an image typically including an array of pixels. Each pixel has a light beam that can be characterized by a color and an intensity level. The color is characterized by the spectral content of the light beam over the human-visible range. Since the fringe pattern is primarily used for an imaging purpose rather than for seeing by people, it is used herein in the specification and the appended claims that intensity refers to a level of luminous intensity measured in terms of the radiation power rather than in terms of luminous flux, the latter being defined with reference to a human eye. This definition of intensity is adopted as the fringe pattern may be generated by a projector. The projector usually accepts inputs by specifying RGB (red, green, blue) components of a pixel in binary words. For example, a first pixel has R=0, G=255 and B=0, and a second pixel has R=0, G=0 and B=255, where R, G and B stand for the red, the green and the blue components, respectively, of the pixel. By the aforementioned selections of RGB components, the projector is prepared to generate the first and the second pixels each with a substantially-similar level of radiation power, so that the two pixels so generated have substantially-similar intensity levels according to the definition used herein. The luminous flux levels of these two pixels are, however, quite different.

As used herein in the specification and the appended claims, a "feature" of the fringe pattern is characterized by both a color and an intensity. Such feature may be an individual fringe, a line, a point, a pixel, an area, or anything appeared on the fringe pattern. In particular, the feature is characterized by both said color and said intensity in the sense that a light beam or plural light beams representing, or forming, the feature have said color and said intensity. Since the fringe pattern is generally intended to be generated by a projector, it does not make sense to use a black color to represent a completely dark region of the feature, where no light is generated to represent or form the completely dark region. In the special case of the completely dark region, it is defined herein that the completely dark region has a zero intensity level and a color selected to be the color of a non-dark region immediately adjacent to the completely dark region. By excluding the black color in representing the completely dark region, it becomes unambiguous to express that, for example, the fringe pattern has a substantially-uniform illumination color for projection onto an object even though the fringe pattern may include a minor part having one or more completely dark regions due to substantially sinusoidal modulation in intensity.

In three-dimensional measurement of an object's shape, one predetermined fringe pattern is projected onto the object, or more-than-one predetermined fringe patterns are successively projected at different time instants onto the object. The object then distorts the one or more predetermined fringe patterns. Thereby one or more distorted fringe images are generated. The one or more distorted fringe images are analyzed to estimate an unwrapped phase map. The unwrapped phase map characterizes one or more intensity distributions of the one or more distorted fringe images. A depth distribution of the object's shape is then obtainable from the unwrapped phase map.

The present invention discloses a configuration of the one or more predetermined fringe patterns. Each of the one or more predetermined fringe patterns comprises plural fringes that are periodically arranged thereon. The fringes may be referenced and identified by fringe numbers. Each of the fringes has a fringe width and is modulated in light intensity across the fringe width. Preferably the aforementioned light intensity is substantially sinusoidally modulated. However, the present invention is not limited to using a sinusoidal function in modulating the light intensity. A non-sinusoidal function may be used. In case that more-than-one predetermined fringe patterns are used, such plural fringe patterns may be derived from one reference fringe pattern with different phase offsets for different predetermined fringe patterns, each of the phase offsets denoting a shift in position for fringes in the reference fringe pattern. See KARPINSKY and ZHANG mentioned above for an example of generating three such predetermined fringe patterns. In the disclosed configuration, at least one of the one or more predetermined fringe patterns is further configured to be a color-encoded fringe pattern. The color-encoded fringe pattern inherits the aforementioned characteristics that configure the one or more predetermined fringe patterns, and incorporates additional characteristics as follows.

FIG. 1 depicts a configuration of the color-encoded fringe pattern in accordance with an exemplary embodiment of the present invention. A color-encoded fringe pattern 100 comprises a plurality of fringes that are periodically arranged. As shown in FIG. 1, fringes 110, 120, 130 are arranged in a periodic, sequential manner.

Take the fringe 120 as a representative fringe for illustration. The fringe 120 has a fringe width 122. As is mentioned above, the light intensity of the fringe 120 is modulated (with a modulating function) across the fringe width 122. In addition, the fringe 120 comprises a colored line 125 at a location on the fringe width 122. The colored line 125 has a line width that is substantially narrower than the fringe width 122 in order that the colored line 125 has a substantially-similar light intensity over the line width. The light intensity of the colored line 125 is not arbitrarily chosen, but is selected such that the requirement of the light intensity across the fringe width 122 being modulated with the modulating function is satisfied. It follows that the location of the colored line 125 determines the light intensity thereof. For practical consideration, preferably the location of the colored line 125 is selected such that, at this location, the fringe 120 has an intensity in the range from 0.2 to 0.8 of a maximum intensity over the fringe width 122. The colored line 125 has a line color. Excluding the colored line 125, the remaining part of the fringe 120 has a fringe color that is substantially uniform over the fringe 120. The fringe color is substantially different from the line color. Since the colored line 125 is substantially narrower than the fringe width 122, it follows that a major part of the fringe 120 is configured to illuminate the object with light of a single color, which is the fringe color. Although it is shown in FIG. 1 that the colored line 125 is a continuous line, the present invention is not limited to this configuration only. It is possible that the colored line 125 is not entirely continuous over the fringe 120. For example, the colored line 125 may be a broken line. The type of line selected for the colored line 125 depends on the form of the color-encoded fringe pattern 100.

Furthermore, all the fringes of the color-encoded fringe pattern 100 have their fringe colors that are substantially similar. As an example shown in FIG. 1, the fringes 110, 120, 130 have substantially-similar fringe colors. Therefore, a major portion of the color-encoded fringe pattern 100 provides a substantially-uniform illumination color for projection onto the object, thereby maintaining a substantially-similar accuracy in three-dimensional measurement as compared to using monochromatic fringe patterns. A preferable color for use as the illumination color can be determined by an ordinary person skilled in the art. For example, white light having a high color render index (CRI) is one preferable choice for the illumination color.

Figure 2A:
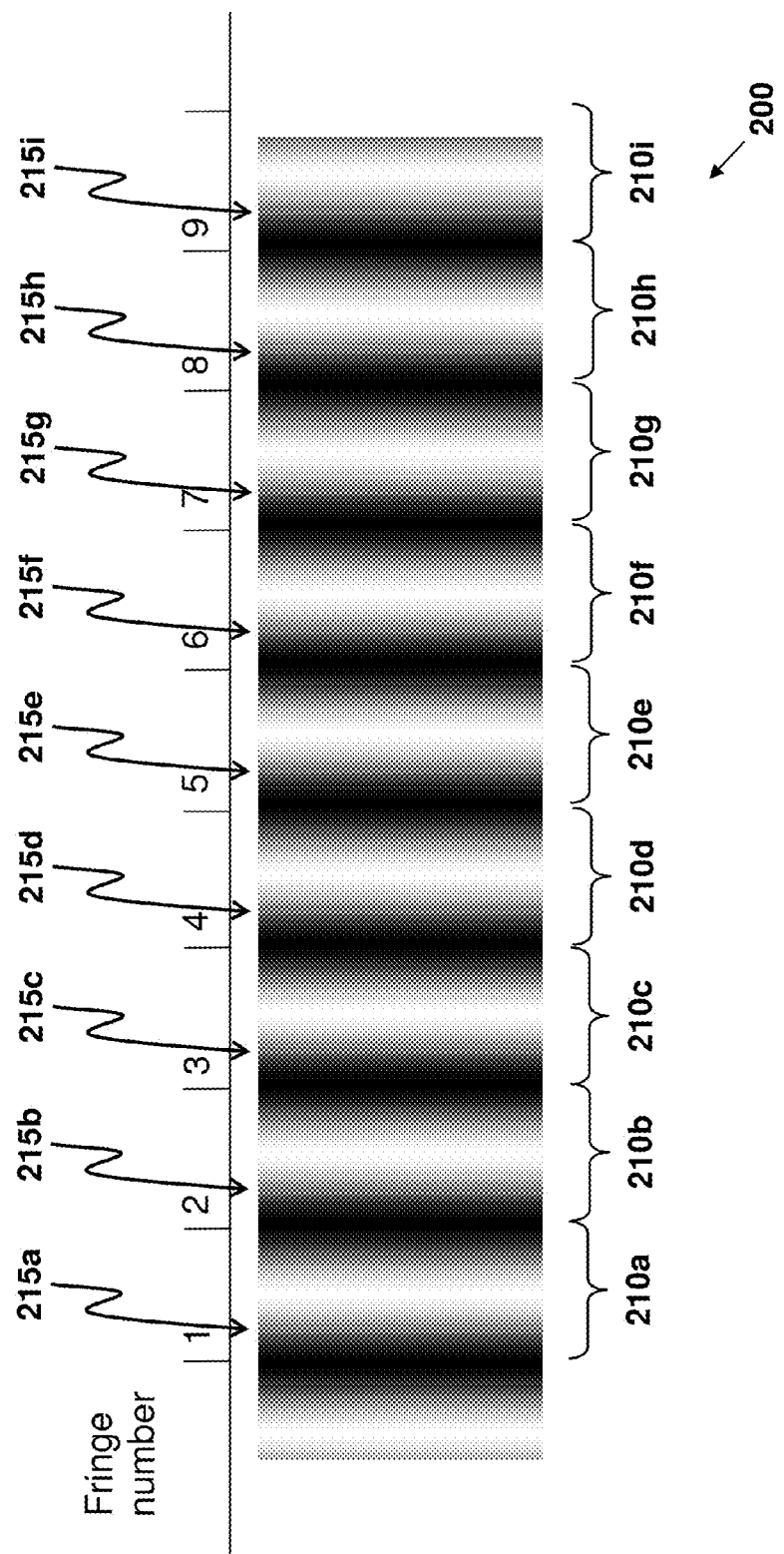
FIG. 2a is an example of the color-encoded fringe pattern where the colored lines are located such that these colored lines have substantially similar intensities on the fringe pattern.
Figure 2B:
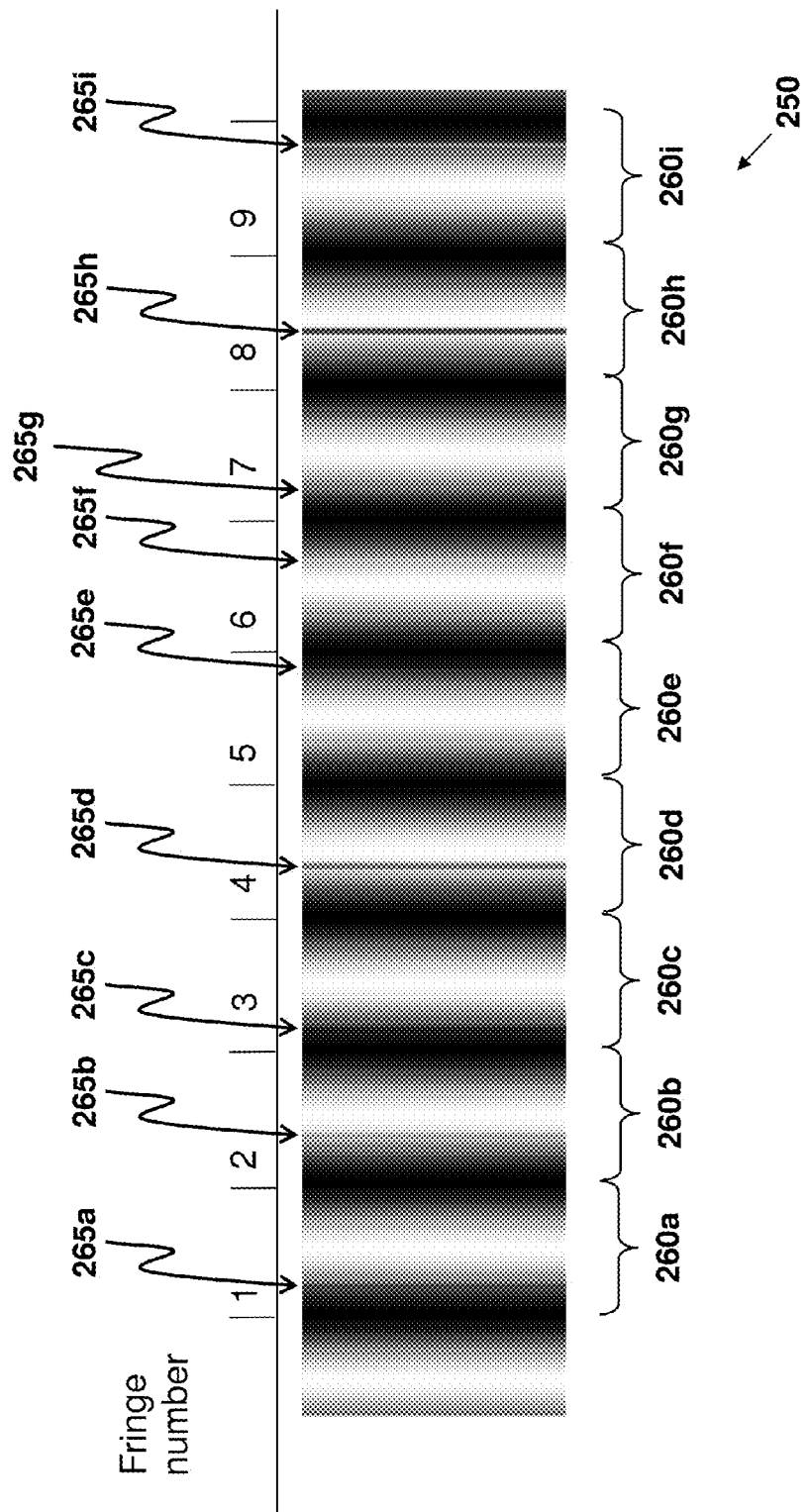
FIG. 2b is an example of the color-encoded fringe pattern where intensities of the fringe pattern at the locations of colored lines are in general different.

In all the fringes of the color-encoded fringe pattern 100, the locations of colored lines may be selected such that, at these locations, all the fringes of the colored-encoded fringe pattern 100 have substantially similar intensities. An example is shown in FIG. 2a, where fringes 210a-210i of a color-encoded fringe pattern 200 have colored lines 215a-215i that are substantially similar in intensity by being located at similar locations in respective fringes. Alternatively, the colored lines may be configured to have non-unique intensity levels by being not located at similar locations. An example is given in FIG. 2b, where fringes 260a-260i of a color-encoded fringe pattern 250 have colored lines 265a-265i located at non-unique locations in respective fringes such that intensity levels of the colored lines 265a-265i are in general not the same.

A main purpose of introducing colored lines to the color-encoded fringe pattern 100 is to provide side information that allows differentiation of different fringes so as to assist determination of fringe orders during estimation of the unwrapped phase map. To allow provision of such differentiation information, in one approach, line colors of any adjacent two of the fringes are substantially different. As an example shown in FIG. 1, the line color of the colored line 125 of the fringe 120 is claret whereas the two adjacent fringes, i.e. the fringe 110 and the fringe 130, have the colored lines 115, 135 whose line colors are scarlet and deep blue, respectively, both of which are different from claret. There are many kinds of pre-determined permutation and combination rules that can be used to arrange the color lines, such as De Bruijn sequence.

It is desirable to reduce the likelihood of erroneously identifying the line color of a fringe in a distorted fringe image generated from the color-encoded fringe pattern 100. To achieve this result, preferably the line colors of the fringes in the color-encoded fringe pattern 100 are selected to have substantially-high chromatic contrast against one or more colors appeared on the object's surface. It is possible that before generating the color-encoded fringe pattern 100, an image of the object is first pre-scanned and analyzed in order to identify appropriate colors to be used as the line colors of the fringes.

In one embodiment, the line colors of all the fringes in the color-encoded fringe pattern 100 are selected by the following approach. These line colors are first viewed as collectively constituting an ordered sequence of selected line colors. The line colors are further configured such that the ordered sequence is a pseudo-random sequence or a periodic repetition thereof. It follows that the pseudo-random sequence has a period less than or equal to the ordered sequence's length. Thereby, in a fringe image generated by distorting the color-encoded fringe pattern 100 by the object's shape, a particular fringe may be identifiable even if said particular fringe is shifted from the original position in the color-encoded fringe pattern 100 by a number of fringes less than half the pseudo-random sequence's period. This property of assisting identification of the particular fringe (and its fringe number) even in the presence of a large shift is advantageous in the three-dimensional measurement of an object if the object has a major discontinuity that is sharp and high-rise on the object. This type of object may be, for example, a box. In forming the pseudo-random sequence, each element therein is a color selected from a set of candidate colors. Generally, the number of the candidate colors is more than two, so that the pseudo-random sequence is usually a multi-level sequence. Methods for designing multi-level pseudo-random sequences having desirable properties can be found in, for example, US2007005673.

In general, the line colors of the fringes in the color-encoded fringe pattern 100 are selected from a finite set of candidate colors. One disadvantage of using only one color-encoded fringe pattern among the one or more predetermined fringe patterns is that the number of the candidate colors is preferred to be large. A large set of candidate colors is preferred in order that, by increasing separation of any two fringes that share the same candidate color, a large displacement of a particular fringe in a fringe image distorted by the object is still identifiable. However, it is generally not easy to find out a large set of candidate colors due to many practical constraints such as the requirement of high chromatic contrast as mentioned above.

An embodiment of the present invention is directed to use a relatively small set of candidate colors provided that more-than-one predetermined fringe patterns are used. In this embodiment, N predetermined fringe patterns, N greater than 1, are used. Each of the N predetermined fringe patterns has the same number of fringes. Each fringe is referenced by a fringe number. Out of these N predetermined fringe patterns, M patterns are selected, where M is greater than 1 and is less than or equal to N. In addition, each of the M selected predetermined fringe patterns is configured to be the color-encoded fringe pattern. Line colors of related fringes under the same fringe number in the M selected predetermined fringe patterns collectively constitute a codeword for related fringes under this fringe number. It follows that the codeword comprises M selected line colors. In particular, codewords for any first related fringes and any second related fringes, where the first and the second related fringes are fringe-wise adjacent, are substantially different. Differentiation information is thus provided for assisting determination of fringe orders during estimation of the unwrapped phase map. As used herein, first related fringes and second related fringes being said to be "fringe-wise adjacent" means that any one of the first related fringes and the corresponding one of the second related fringes under the same predetermined fringe pattern are adjacent in position.

FIG. 3 provides an example of using three color-encoded fringe patterns in accordance with the aforementioned embodiment. For illustration, consider a particular fringe having 2 as the fringe number. Predetermined fringe patterns 310, 320, 330, all of which are configured as color-encoded fringe patterns, have colored lines 312, 322, 332, respectively. The colored lines 312, 322, 332 have line colors that are deep blue, green and yellow, respectively. The line colors of the three colored lines 312, 322, 332 form a codeword 350. Adjacent codewords 340, 360 are different from the codeword 350. Note that four candidate colors are used for the predetermined fringe patterns 310, 320, 330. It follows that there are 124=5×5×5−1 possible combinations for selection as any of the codewords 340, 350, 360. It demonstrates that using a relatively small set of candidate colors can provide a large set of possible codeword combinations, thus allowing a large displacement of a particular fringe in a distorted fringe image to be identifiable.

In one embodiment, it is possible that the colored lines in all the fringes are replaced by another type of colored lines that do not collectively point in a direction substantially parallel to the fringes' orientation. In this embodiment, the color-encoded fringe pattern comprises a plurality of colored oblique lines each spanning across two or more of the fringes. Each of the colored oblique lines is oriented in a direction substantially non-parallel to the fringes' orientation so that an individual fringe selected from the fringes comprises plural colored-oblique-line segments on the individual fringe. Any point on the colored-oblique-line segments has an intensity determined by the point's location on the individual fringe. The colored-oblique-line segments collectively have a line color. In this embodiment, except that the colored lines are replaced by the colored-oblique-line segments, other characteristics of the color-encoded pattern fringe are substantially similar to those in other embodiments disclosed herein.

Figure 4:
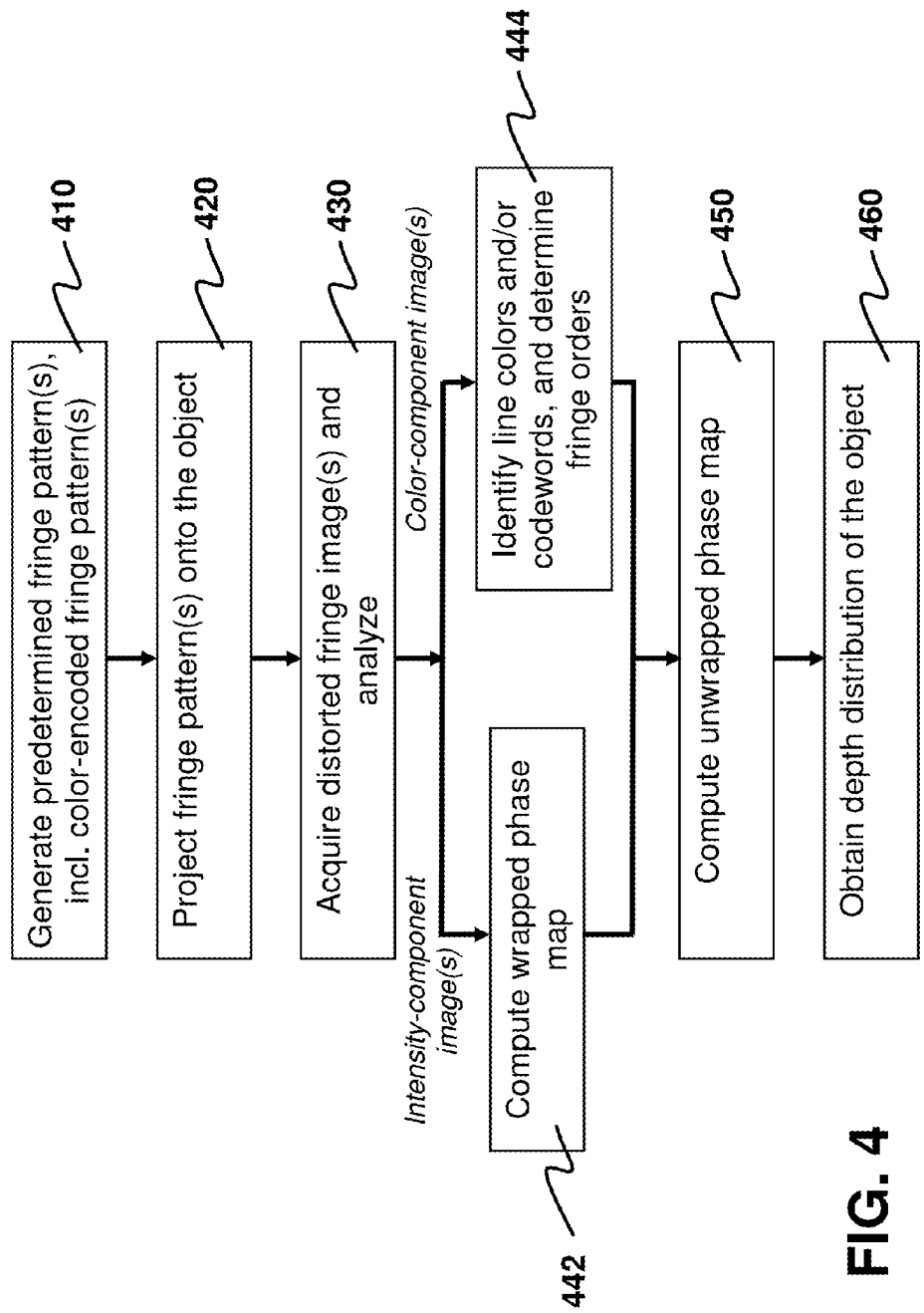
FIG. 4 depicts, in accordance with one embodiment of the present invention, a flowchart illustrating the steps of using one or more color-encoded fringe patterns in three-dimensional measurement of an object.
Figure 5:
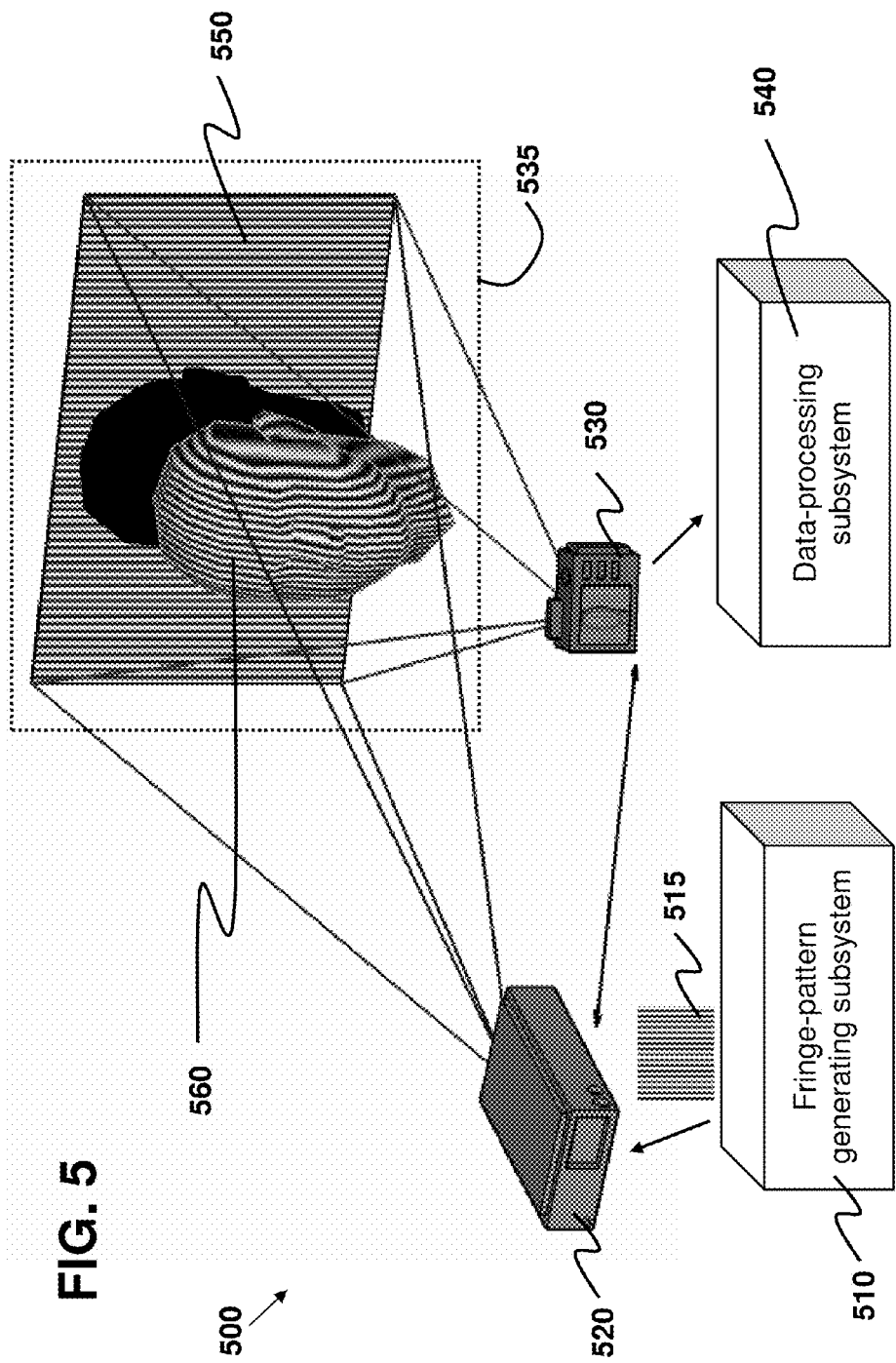
FIG. 5 depicts, in accordance with one embodiment of the present invention, a system for optically, three-dimensionally measuring an object's shape.

The present invention further discloses an optical method for three-dimensionally measuring an object's shape and a corresponding system for implementing this method, where both the method and the system employ the configuration of the one or more predetermined fringe patterns as disclosed above. FIG. 4 depicts, according to one embodiment of the present invention, a flowchart of using the disclosed configuration to obtain a depth distribution of an object under three-dimensional measurement. FIG. 5 depicts a system 500 for three-dimensional measurement of the object.

In a first step 410 of the optical method, the one or more predetermined fringe patterns, at least one of which is the colored-encoded fringe pattern, are generated. A fringe-pattern generating subsystem 510 in the system 500 is used to generate the one or more predetermined fringe patterns (indicated as fringe pattern 515). Typically, the fringe-pattern generating subsystem 510 is a computing system comprising one or more processors configured to generate the one or more predetermined fringe patterns 515.

In a next step 420, the one or more predetermined fringe patterns are projected onto the object. In the system 500, this projection is performed by using a projector 520 to project the one or more predetermined fringe patterns 515 obtained from the fringe-pattern generating subsystem 510 onto an object 560 for measurement. The object 560 is put on or in front of a background 550. As the background 550 is generally used as a reference plane, preferably the background 550 is substantially flat. The presence of the object 560 distorts the one or more predetermined fringe patterns projected by the projector 520, generating one or more distorted fringe images 535.

In another next step 430, the one or more distorted fringe images are acquired for analysis. In the system 500, a camera 530 is used to acquire the one or more distorted fringe images 535. The one or more distorted fringe images 535 as acquired are sent to a data-processing subsystem 540 for further processing.

If any of the one or more distorted fringe images is a distorted color-encoded fringe image originated from a color-encoded fringe pattern, the distorted color-encoded fringe image is decomposed into an intensity-component image and a color-component image. The intensity-component image is usable in estimating a wrapped phase map. The color-component image is usable in unwrapping the wrapped phase map to yield an unwrapped phase map. If a distorted fringe image under consideration is not originated from a color-encoded fringe pattern, it only yields an intensity-component image. When all the intensity-component image(s) and the color-component image(s) are obtained after processing the one or more distorted fringe images, steps 442, 444 can be executed. In the step 442, the wrapped phase map is computed based on the obtained intensity-component image(s). In the step 444, line colors and/or codewords in the color-component image(s) are identified. Based on the identification results, fringe orders are determined.

After the wrapped phase map is obtained and the fringe orders are determined, the unwrapped phase map is computed in a step 450. Thereafter, the depth distribution of the object is computed based on the unwrapped phase map, as is done in a step 460.

The steps 442, 444, 450, 460 may be performed by the data-processing subsystem 540. The data-processing subsystem 540 may be implemented as a computing system.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. An optical method for three-dimensionally measuring an object's shape, comprising:

projecting one predetermined fringe pattern onto the object or successively projecting more-than-one predetermined fringe patterns onto the object, so that the object distorts the one or more predetermined fringe patterns and thereby one or more distorted fringe images are generated; and analyzing the one or more distorted fringe images to estimate an unwrapped phase map that characterizes one or more intensity distributions of the one or more distorted fringe images, so that a depth distribution of the object's shape is obtainable from the unwrapped phase map;

wherein:

each of the one or more predetermined fringe patterns comprises plural fringes that are periodically arranged thereon, each of the fringes having a fringe width and being modulated in intensity across the fringe width; and at least one of the one or more predetermined fringe patterns is further configured to be a color-encoded fringe pattern, the color-encoded fringe pattern being configured such that:

an individual fringe selected from the fringes comprises a colored line at a location on the fringe width, the colored line having a line width that is substantially narrower than the fringe width in order that the colored line has a substantially similar intensity over the line width, the intensity of the colored line being determined by the location of the colored line, the colored line further having a line color; and line colors of all the fringes, collectively constituting an ordered sequence of selected line colors, are configured such that the ordered sequence is a pseudo-random sequence or a periodic repetition thereof.

2. The method of claim 1, wherein the color-encoded fringe pattern is further configured such that:

the individual fringe excluding the colored line has a fringe color that is substantially uniform over the individual fringe, the fringe color being substantially different from the line color; and fringe colors of all the fringes are substantially similar, thereby enabling a major portion of the color-encoded fringe pattern to provide a substantially-uniform illumination color for projection onto the object.

3. The method of claim 1, wherein for each of the one or more predetermined fringe patterns, each of the fringes therein is substantially sinusoidally modulated in intensity across the fringe width.

4. The method of claim 1, wherein the color-encoded fringe pattern is further configured such that line colors of any adjacent two of the fringes are substantially different to thereby provide differentiation information for assisting determination of fringe orders during estimation of the unwrapped phase map.

5. The method of claim 1, wherein:

the number of the one or more predetermined fringe patterns is N where N is greater than 1, each of the N predetermined fringe patterns having the same number of fringes, each fringe being referenced by a fringe number;

M out of the N predetermined fringe patterns, M greater than 1 and less than or equal to N, are selected such that each of the M selected predetermined fringe patterns is configured to be the color-encoded fringe pattern, line colors of related fringes under the same fringe number in the M selected predetermined fringe patterns collectively constituting a codeword for related fringes under this fringe number; and codewords for any first related fringes and any second related fringes, where the first and the second related fringes are fringe-wise adjacent, are substantially different to thereby provide differentiation information for assisting determination of fringe orders during estimation of the unwrapped phase map.

6. The method of claim 1, wherein if more-than-one predetermined fringe patterns are used, the predetermined fringe patterns are derived from one reference fringe pattern with different phase offsets for different predetermined fringe patterns, each of the phase offsets denoting a shift in position for fringes in the reference fringe pattern.

7. The method of claim 1, wherein the analyzing of the one or more distorted fringe images includes:

if any of the one or more distorted fringe images is a distorted color-encoded fringe image generated from distorting a color-encoded fringe pattern by the object's shape, decomposing the distorted color-encoded fringe image into an intensity-component image and a color-component image, so that the intensity-component image is usable in estimating a wrapped phase map, and the color-component image is usable in unwrapping the wrapped phase map to yield the unwrapped phase map.

8. The method of claim 1, wherein the location of the colored line in the individual fringe of the color-encoded fringe pattern is selected such that, at this location, the individual fringe has an intensity in the range from 0.2 to 0.8 of a maximum intensity over the fringe width of the individual fringe.

9. The method of claim 1, wherein the locations of colored lines in all the fringes of the color-encoded fringe pattern are selected such that, at these locations, all the fringes of the color-encoded fringe pattern have substantially similar intensities.

10. The method of claim 1, wherein the locations of colored lines in all the fringes of the color-encoded fringe pattern are selected such that, at these locations, intensities of all the fringes of the color-encoded fringe pattern are non-unique.

11. A fringe-pattern generating subsystem configured to be used in a system for three-dimensionally measuring an object's shape, the fringe-pattern generating subsystem comprising one or more processors configured to generate one or more predetermined fringe patterns wherein:

each of the one or more predetermined fringe patterns comprises plural fringes that are periodically arranged thereon, each of the fringes having a fringe width and being modulated in intensity across the fringe width; and at least one of the one or more predetermined fringe patterns is further configured to be a color-encoded fringe pattern, the color-encoded fringe pattern being configured such that:

an individual fringe selected from the fringes comprises a colored line at a location on the fringe width, the colored line having a line width that is substantially narrower than the fringe width in order that the colored line has a substantially similar intensity over the line width, the intensity of the colored line being determined by the location of the colored line, the colored line further having a line color; and line colors of all the fringes, collectively constituting an ordered sequence of selected line colors, are configured such that the ordered sequence is a pseudo-random sequence or a periodic repetition thereof.

12. The fringe-pattern generating subsystem of claim 11, wherein the color-encoded fringe pattern is further configured such that:

the individual fringe excluding the colored line has a fringe color that is substantially uniform over the individual fringe, the fringe color being substantially different from the line color; and fringe colors of all the fringes are substantially similar, thereby enabling a major portion of the color-encoded fringe pattern to provide a substantially-uniform illumination color for projection onto the object.

13. The fringe-pattern generating subsystem of claim 11, wherein for each of the one or more predetermined fringe patterns, each of the fringes therein is substantially sinusoidally modulated in intensity across the fringe width.

14. The fringe-pattern generating subsystem of claim 11, wherein the color-encoded fringe pattern is further configured such that line colors of any adjacent two of the fringes are substantially different to thereby provide differentiation information for assisting determination of fringe orders during estimation of an unwrapped phase map.

15. The fringe-pattern generating subsystem of claim 11, wherein:

the number of the one or more predetermined fringe patterns is N where N is greater than 1, each of the N predetermined fringe patterns having the same number of fringes, each fringe being referenced by a fringe number;

M out of the N predetermined fringe patterns, M greater than 1 and less than or equal to N, are selected such that each of the M selected predetermined fringe patterns is configured to be the color-encoded fringe pattern, line colors of related fringes under the same fringe number in the M selected predetermined fringe patterns collectively constituting a codeword for this fringe number; and codewords for any first related fringes and any second related fringes, where the first and the second related fringes are fringe-wise adjacent, are substantially different to thereby provide differentiation information for assisting determination of fringe orders during estimation of an unwrapped phase map.

16. The fringe-pattern generating subsystem of claim 11, wherein the location of the colored line in the individual fringe of the color-encoded fringe pattern is selected such that, at this location, the individual fringe has an intensity in the range from 0.2 to 0.8 of a maximum intensity over the fringe width of the individual fringe.

17. The fringe-pattern generating subsystem of claim 11, wherein the locations of colored lines in all the fringes of the color-encoded fringe pattern are selected such that, at these locations, all the fringes of the color-encoded fringe pattern have substantially similar intensities.

18. The fringe-pattern generating subsystem of claim 11, wherein the locations of colored lines in all the fringes of the color-encoded fringe pattern are selected such that, at these locations, intensities of all the fringes of the color-encoded fringe pattern are non-unique.

19. A system for three-dimensionally measuring an object's shape, the system comprising:

the fringe-pattern generating subsystem of claim 11;

a projector for projecting the one or more predetermined fringe patterns generated by the fringe-pattern generating subsystem onto the object;

a camera for acquiring one or more distorted fringe images generated by distorting the one or more predetermined fringe patterns when projected onto the object; and a data-processing subsystem configured to estimate an unwrapped phase map that characterizes one or more intensity distributions of the one or more distorted fringe images by analyzing the one or more distorted fringe images acquired by the camera, and to compute a depth distribution of the object's shape according to the unwrapped phase map.

20. A fringe-pattern generating subsystem configured to be used in a system for three-dimensionally measuring an object's shape, the fringe-pattern generating subsystem comprising one or more processors configured to generate one or more predetermined fringe patterns wherein:

each of the one or more predetermined fringe patterns comprises plural fringes that are periodically arranged thereon, each of the fringes having a fringe width and being modulated in intensity across the fringe width; and at least one of the one or more predetermined fringe patterns is further configured to be a color-encoded fringe pattern, the color-encoded fringe pattern being configured such that:

the color-encoded fringe pattern comprises a plurality of colored oblique lines each of which spans across at least two of the fringes and is oriented in a direction substantially non-parallel to the fringes' orientation, so that an individual fringe selected from the fringes comprises plural colored-oblique-line segments on the individual fringe, any point on the colored-oblique-line segments having an intensity determined by the point's location on the individual fringe, the colored-oblique-line segments collectively having a line color; and line colors of all the fringes, collectively constituting an ordered sequence of selected line colors, are configured such that the ordered sequence is a pseudo-random sequence or a periodic repetition thereof.

21. An optical method for three-dimensionally measuring an object's shape, comprising:

projecting one predetermined fringe pattern onto the object or successively projecting more-than-one predetermined fringe patterns onto the object, so that the object distorts the one or more predetermined fringe patterns and thereby one or more distorted fringe images are generated; and analyzing the one or more distorted fringe images to estimate an unwrapped phase map that characterizes one or more intensity distributions of the one or more distorted fringe images, so that a depth distribution of the object's shape is obtainable from the unwrapped phase map;

wherein:

each of the one or more predetermined fringe patterns comprises plural fringes that are periodically arranged thereon, each of the fringes having a fringe width and being modulated in intensity across the fringe width; and at least one of the one or more predetermined fringe patterns is further configured to be a color-encoded fringe pattern, the color-encoded fringe pattern being configured such that:

an individual fringe selected from the fringes comprises a colored line at a location on the fringe width, the colored line having a line width that is substantially narrower than the fringe width in order that the colored line has a substantially similar intensity over the line width, the intensity of the colored line being determined by the location of the colored line, the colored line further having a line color; and the analyzing of the one or more distorted fringe images includes:

if any of the one or more distorted fringe images is a distorted color-encoded fringe image generated from distorting a color-encoded fringe pattern by the object's shape, decomposing the distorted color-encoded fringe image into an intensity-component image and a color-component image, so that the intensity-component image is usable in estimating a wrapped phase map, and the color-component image is usable in unwrapping the wrapped phase map to yield the unwrapped phase map.

* * * * *